(12) United States Patent
Wang et al.

(10) Patent No.: US 8,706,416 B2
(45) Date of Patent: Apr. 22, 2014

(54) SYSTEM AND METHOD FOR DETERMINING A VEHICLE ROUTE

(75) Inventors: Qing Wang, Canton, MI (US); Anthony Mark Phillips, Northville, MI (US); Ryan Abraham McGee, Ann Arbor, MI (US); Xiaoyong Wang, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 13/438,229

(22) Filed: Apr. 3, 2012

(65) Prior Publication Data

US 2013/0261966 A1   Oct. 3, 2013

(51) Int. Cl.
*G01C 21/00* (2006.01)

(52) U.S. Cl.
USPC .......................................... 701/533

(58) Field of Classification Search
USPC .......................................... 701/533
See application file for complete search history.

(56) References Cited

U.S. PATENT DOCUMENTS

| | | | |
|---|---|---|---|
| 6,487,477 | B1 | 11/2002 | Woestman et al. |
| 6,941,220 | B2 | 9/2005 | Le et al. |
| 7,206,677 | B2 | 4/2007 | Hulden |
| 7,783,417 | B2 | 8/2010 | Vavrus |
| 7,849,944 | B2 * | 12/2010 | DeVault ................ 180/65.29 |
| 8,108,083 | B2 * | 1/2012 | Kameyama .................. 701/1 |
| 2007/0192038 | A1 * | 8/2007 | Kameyama ................. 702/19 |
| 2008/0133120 | A1 * | 6/2008 | Romanick .................. 701/123 |
| 2008/0221787 | A1 * | 9/2008 | Vavrus ........................ 701/201 |
| 2008/0270016 | A1 * | 10/2008 | Proietty et al. ............. 701/123 |
| 2009/0157290 | A1 | 6/2009 | Ji et al. |
| 2009/0259354 | A1 | 10/2009 | Krupadanam et al. |
| 2010/0049397 | A1 * | 2/2010 | Liu et al. ..................... 701/33 |
| 2010/0057339 | A1 | 3/2010 | Pryakhin et al. |
| 2010/0088012 | A1 | 4/2010 | O'Sullivan et al. |
| 2010/0114473 | A1 | 5/2010 | Kono et al. |

(Continued)

FOREIGN PATENT DOCUMENTS

| | | |
|---|---|---|
| EP | 2221581 A1 | 8/2010 |
| JP | 2007333668 A | 12/2007 |
| WO | 2010081836 A1 | 7/2010 |
| WO | 2011066468 A1 | 6/2011 |

OTHER PUBLICATIONS

Toshiaki Kono, et al., Fuel Consumption Analysis and Prediction Model for "ECO" Route Search, Published Nov. 2008; 9 Pages.

(Continued)

*Primary Examiner* — Thomas Tarcza
*Assistant Examiner* — Alex C Dunn
(74) *Attorney, Agent, or Firm* — Jennifer M. Stec; Brooks Kushman P.C.

(57) ABSTRACT

A method for determining a route for a vehicle includes receiving input indicative of a driver's dynamic control of the vehicle, determining the driver's driving style based on the input, and selecting values of parameters representing the driver's anticipated dynamic control of the vehicle based on the driving style. The method also includes identifying a plurality of candidate routes between an origin and destination, partitioning each of the candidate routes into a set of predefined route patterns, and determining an energy usage associated with each of the candidate routes based on the selected values and the set of predefined route patterns defining the candidate route. The method further includes identifying the candidate route having the minimum energy usage and providing output describing the route having the minimum energy usage.

14 Claims, 4 Drawing Sheets

(56) References Cited

U.S. PATENT DOCUMENTS

| | | | |
|---|---|---|---|
| 2011/0060495 A1* | 3/2011 | Kono et al. | 701/33 |
| 2011/0060517 A1* | 3/2011 | Kono et al. | 701/123 |
| 2011/0106381 A1* | 5/2011 | Filev et al. | 701/40 |
| 2011/0160993 A1 | 6/2011 | Tsurutani et al. | |
| 2011/0288765 A1* | 11/2011 | Conway | 701/201 |
| 2011/0307166 A1* | 12/2011 | Hiestermann et al. | 701/119 |
| 2012/0173444 A1* | 7/2012 | Zik | 705/317 |
| 2012/0221170 A1* | 8/2012 | Tanoue et al. | 701/1 |
| 2012/0316699 A1* | 12/2012 | Filev et al. | 701/1 |

OTHER PUBLICATIONS

Abhishek Visveswaran, "Eco-driving—Harnessing the green potential of ITS", European Telematics and ITS, 2009; 4 Pages.

Hai Yu et al., Driving Pattern Identification for EV Range Estimation, IEVC, Mar. 2012, 7 pgs., Electrification Research and Advanced Engineering, Ford Motor Company, Dearborn, MI 48121.

* cited by examiner

SYSTEM AND METHOD FOR DETERMINING A VEHICLE ROUTE

TECHNICAL FIELD

This disclosure relates to algorithms for selecting a fuel efficient vehicle driving route and systems implementing the same.

BACKGROUND

Global Positioning System (GPS) information may be used to determine a route from an origin to a destination. Certain routes may be longer in distance than others. Similarly, certain routes may have greater travel times than others. There are factors, however, that determine the energy or fuel usage associated with a certain route that may not be correlated with the distance or travel time in a predictable manner.

SUMMARY

A navigation system for a vehicle receives input indicative of a driver's dynamic control of the vehicle, determines the driver's driving style based on the input, and selects values of parameters representing the driver's anticipated dynamic control of the vehicle based on the driving style. The navigation system further identifies a route between an origin and destination that minimizes energy consumption of the vehicle based on the selected values.

DETAILED DESCRIPTION

Embodiments of the present disclosure are described herein; however, it is to be understood that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
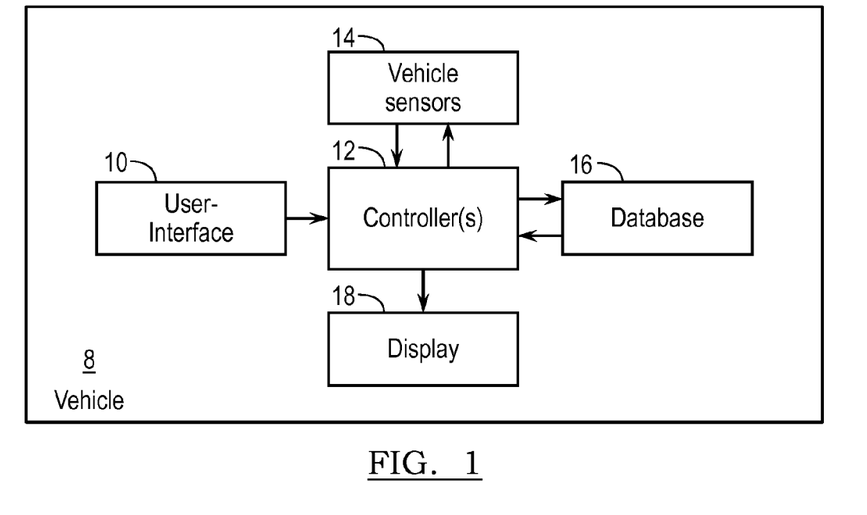
FIG. 1 is a block diagram of an automotive vehicle.

FIG. 1 is a schematic block diagram of a system for determining a vehicle route optimized for fuel economy or energy efficiency. Within a vehicle 8, a user inputs a destination address using the user-interface 10 which can either be a touch screen (display) 18 or a keyboard. The destination point is sent to one or more vehicle controllers to compute the route. The present position of the vehicle 8 may be used as an origin point. The controllers 12 may interface with the telematics computer in the vehicle 8 and a plurality of vehicle sensors 14 to receive vehicle data such as energy usage, temperature, vehicle weight and vehicle load. The vehicle sensor information can be obtained through, for example, an OBD port (not shown). The controllers 12 may need to have an interface with the OBD port which can send vehicle readings through the wired connection. Alternatively, the OBD port can be interfaced wirelessly using Bluetooth or other similar short-range wireless protocols. The controllers 12 also interface with a database 16 that stores roadway map, traffic and weather information for a given route. The controllers 12 can receive this information locally when it is stored in the telematics computer in the vehicle 8. It can also be downloaded remotely using either a mobile modem or cellular broadband network on a mobile phone. Once the controllers 12 have received the information from the database 16, the controllers 12 may analyze the route information and propose a number of candidate routes. The controllers 12 may calculate the estimated energy usage for a given route and display that information via the display screen 18.

There are often many possible routes that can be taken between the origin point A and destination point B. Currently, many GPS systems optimize based on distance or travel time. It may also be possible to optimize based on energy usage or fuel consumption. Because the total energy usage is based on a variety of factors (See Equation 1) both linear and non-linear, it is not directly correlated with distance or travel time.

$$E_{route_i} = \frac{Distance_{route_i}}{(\eta_{veh})_{route_i}} \quad (1)$$

$E_{route}$ is the total energy used for a particular route and $\eta_{veh}$ is the vehicle energy efficiency coefficient. This coefficient is unique to each vehicle and determines how much fuel is used for a particular distance. $\eta_{veh}$ is calculated in Equation 2.

$$\eta_{veh} = \frac{\int_0^t v\,dt}{\int_0^t \frac{P_{load}}{\eta_{sys\_operation\_eff}}} \quad (2)$$

$\int_0^t v\,dt$ is the integral of the velocity of the vehicle for the time it travels. $P_{load}$ is the road load and $\eta_{sys\_operation\_eff}$ is the overall system efficiency based on the efficiency of the power train and the driveline. The road load, $P_{load}$, may be described as the power required to push the vehicle through a particular distance. This is described in equation 3.

$$P_{load} = M_{veh} g \sin(\beta_{incline}) + \\ M_{veh} g v f_{roll} \cos(\beta_{incline}) + \frac{\rho_{air}}{2}(v+v_0)^2 A_{frontal} C_{drag} + M_{veh} \dot{v} v \quad (3)$$

where
  $M_{veh}$: Vehicle Mass
  g: Gravitational Acceleration Constant
  $\beta_{incline}$: Grade Angle
  v: Vehicle Speed $f_{roll}$: Rolling Resistance Coefficient
$\rho_{air}$: Air Density
$v_0$: Head Wind Velocity
$A_{frontal}$: Frontal Area
$C_{drag}$: Aerodynamic Drag Coefficient Since g and $\rho_{air}$ are constants, the factors which impact the overall power requirements for a vehicle are described in equation 4. These factors are not linear and are difficult to predict because they are dependent on many features unique to particular routes. Therefore, it is difficult to calculate.

$$P_{load} = P_{load}(M_{veh}, \beta_{incline}, v, f_{roll}, v_0, A_{frontal}, C_{drag}) \quad (4)$$

The system operation efficiency $\eta_{sys\_operation\_eff}$ consists of driveline efficiency and powertrain efficiency. $\eta_{sys\_operation\_eff}$ is affected by the vehicle speed profile, road load profile, control strategy, vehicle configuration and parameters, driver, and other environment factors. In general, it can be written as $$\eta_{sys\_operation\_eff} = \eta_{sys\_operation\_eff}(v, P_{load}, \text{Controller}, \text{Veh}, \text{Driver}, \text{Enviroment}) \quad (5)$$

v is the vehicle speed profile and $P_{load}$ is the road load profile. The vehicle speed profile is the amount of energy expended while driving at a particular speed. The road load profile is the amount of power required to accelerate the vehicle. The Controller in equation 5 determines how the energy management is performed. The variable referred to as Environment refers to factors such as humidity and outside temperature that could affect power train efficiency. Some of these factors could be outside temperature, altitude, humidity and wind speed.

The Veh in Equation 5 includes other important factors related to vehicle-specific features such as weight. These maybe viewed as a constant for most vehicles. However, there are some factors in the vehicle that vary such as tire pressure, accessory load, state of charge (SOC) and battery efficiency. The Driver in equation 5 refers to the driving style or how the driver drives the vehicle. This may affect the energy usage significantly. Parameters that could be measured to determine the driving style and its impact on the fuel usage can be the overall aggressiveness of the driver, braking style, gear shifting or how he adjusts his driving to external conditions. Collectively these factors can be referred to as "driving style."

The factors described in equation 5 are normally represented by non-differentiable data maps obtained through tests under certain environmental settings. Vehicle tests or large-scale simulation models through physical modeling are the most effective way to capture its characteristics because it can be computationally intensive to derive these factors analytically.

From equations (2), (4) and (5), the factors that are constant across all routes such as vehicle weight are removed from the calculations. The factors that change based on the driver or route are left and the following equation may be simplified as a function $\eta_{veh}$ as follows:

$$\eta_{veh} = \eta_{veh}(M_{veh}, \beta_{incline}, v, f_{roll}, v_0, A_{frontal}, C_{drag}, \text{Controller}, \text{Veh}, \text{Driver}, \text{Enviroment}) \quad (6)$$

Since $A_{frontal}$ and $M_{veh}$ can be grouped into 'Vehicle' factors, and $v_0$ and $C_{drag}$ can be combined with the 'Environmental' factors, the function to determine vehicle efficiency from equation (6) can be further simplified as follows:

$$\eta_{veh} = \eta_{veh}(\beta_{incline}, f_{roll}, v, \text{Controller}, \text{Veh}, \text{Driver}, \text{Enviroment}) \quad (7)$$

As Equation 8 shows, the total energy used in a sub-route is a function of the vehicle efficiency, grade, road surface condition, velocity, vehicle controllers, driver, and the environment:

$$E_{sub-route_i}(t) = \frac{(Distance_{sub-route_i})}{\eta_{veh}\left(\beta_{incline}, f_{roll}, v, \text{Controller}, \text{Veh}, \text{Driver}, \text{Enviroment}\right)_{sub-route_i}} \quad (8)$$

where
$M_{veh}$: Vehicle Mass
g: Gravitational Acceleration Constant
$\beta_{incline}$: Grade Angle
v: Vehicle Speed
$f_{roll}$: Rolling Resistance Coefficient
$\rho_{air}$: Air Density
$v_0$: Head Wind Velocity
$A_{frontal}$: Frontal Area
$C_{drag}$: Aerodynamic Drag Coefficient These parameters may not be estimated using information about the current state because they exhibit non-linear behavior as they transition from one state to the next. Therefore, estimating the total energy required can be computationally intensive because there could be an infinite number of possible values for each future step.

Certain approaches for estimating the total energy required to travel a route can include estimating vehicle speed, traffic and roadway conditions using pre-existing map data based on mean conditions for a given route. These estimates, however, could vary greatly from the actual energy usage since these solutions are generally not customized for each individual driver. These estimates may also not be finely-tuned to account for changes in roadway conditions or traffic profiles during different parts of the day for example.

In certain algorithms disclosed herein, many of the above parameters are classified into nodes. Each of these nodes represents an estimate for the energy usage. The energy efficiency of these nodes is used to estimate the total energy output. A vehicle can be used to collect data based on different roadway conditions and driving styles (see FIG. 3). Based on the data collected, the energy usage for similar routes can be extrapolated.

Figure 2:
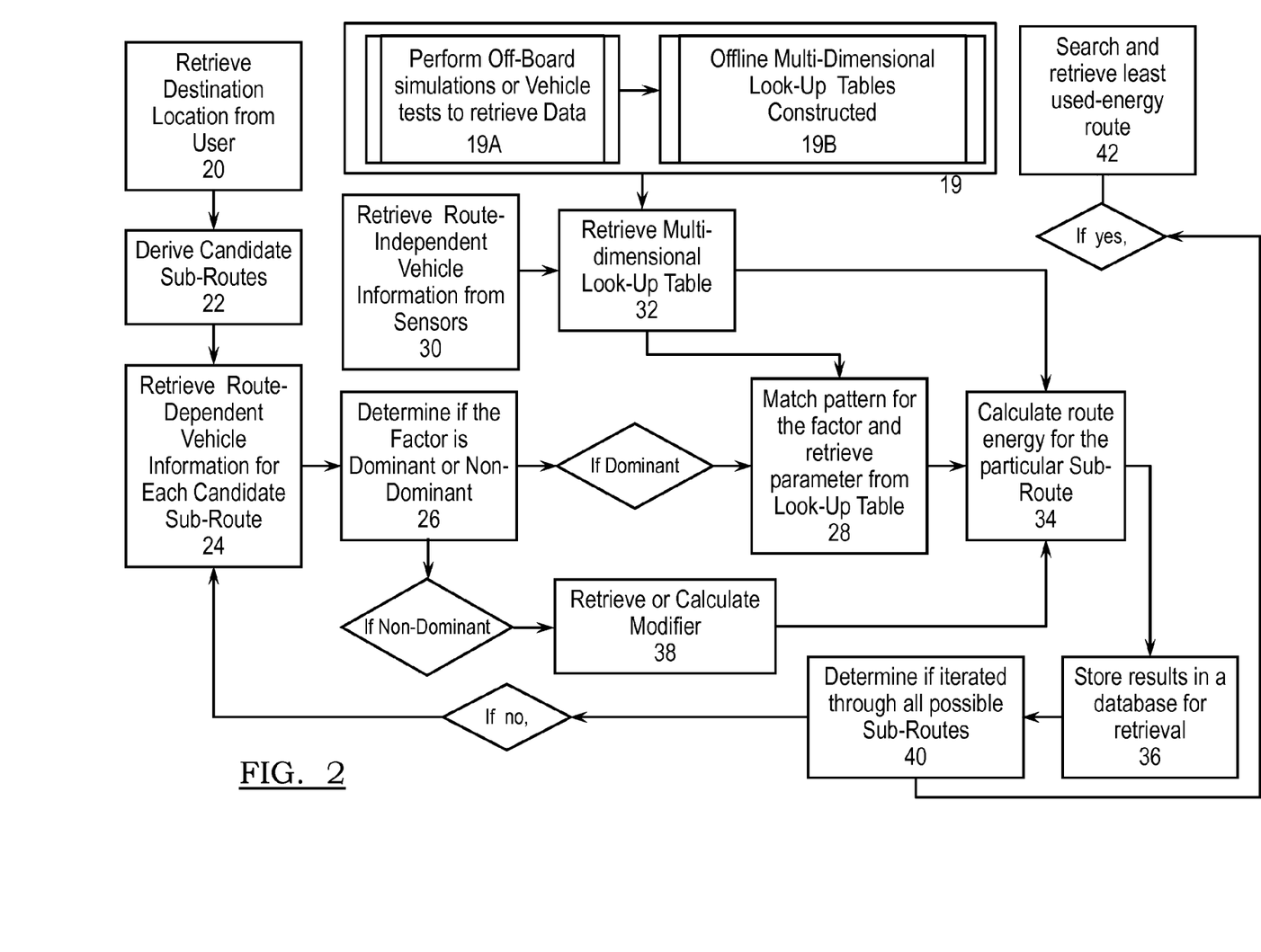
FIG. 2 is a flow chart of a vehicle route prediction algorithm.

FIG. 2 is a flow chart illustrating a vehicle route prediction algorithm using pattern-matching. At operation 19A-19B, energy-usage data is collected by performing off-board model simulations or vehicle tests to formulate look-up tables. The look-up tables can contain various parameters such as those listed in FIG. 3. For each variation in the value for a parameter, a different energy efficiency value is listed. Although the future speed of a vehicle, roadway conditions and traffic can be difficult to precisely predict and calculate, a single vehicle's average energy efficiency is fairly consistent if it is operated within similar driver patterns, roadway conditions and traffic profiles.

The parameters used for calculating vehicle energy-usage are divided into two categories: route-independent and route-dependent. For each type of route-dependent factor as classified in FIG. 3, one can obtain an output of an energy usage factor. For example, the rate of acceleration of the accelerator pedal increases energy usage even when travelling with the same velocity over the same route. Consequently, for each route pattern, vehicle energy usage data is collected by driving the car through known-routes, or alternatively by performing off-board simulations. A route pattern is a set of road conditions (such as incline, curvature, and roadway condition), traffic conditions and weather information that can be used to classify the route-dependent factors on a roadway. This operation calculates and stores that average vehicle energy efficiency among a plurality of route-dependent parameters. After obtaining the vehicle efficiency data, look-up tables can be created and stored. The method for obtaining the training data will be discussed in further detail with reference to FIG. 3.

At operation 19A, many vehicles are tested to collect training data. At operation 19B, based on a set of training data collected at operation 19A, a number of multi-dimensional look-up tables can be created. The look-up tables contain various route-independent values that can be matched with the energy efficiency prediction for a plurality of route-dependent values. The look-up tables can be stored locally within the on-board telematics device or stored remotely on a server. After retrieving route-independent information, appropriate look-up table(s) may be downloaded. These look-up tables may contain estimates of route-dependent parameters along with correlated possible energy usage predictions for each type of route-independent vehicle information.

At operation 20, the destination is retrieved from the user. The user can manually input the destination on the keypad. At operation 22, the algorithm determines all possible sub-routes. For each sub-route, route-dependent information is matched (using pattern matching techniques) to a similar route-dependent factor gathered earlier using off-board simulations at operation 24. Pattern matching will be discussed in further detail with reference to FIG. 4. The route dependent factors, in this example, include speed limit, traffic level, traffic light number, etc. The energy-usage is obtained using pattern-recognition techniques that will be discussed further with reference to FIG. 4.

There are two-types of route dependent factors: 'dominant factors' and 'non-dominant factors.' Examples of dominant route-dependent factors may include speed and roadway conditions. Dominant factors have a non-linear interaction with the overall vehicle energy usage calculation. The impact of dominant factors on the energy calculation is acquired by matching each value for a dominant factor to a value on the look-up table using pattern-matching techniques. These values are gathered to estimate energy usage. Non-dominant route-dependent factors can include wind and road wetness. The non-dominant factors could only have a minor impact on the overall energy-fuel usage calculation. Therefore, intensive pattern-matching may not significantly improve the overall vehicle energy usage calculation to justify the increased computational load. The non-dominant factors can be incorporated though a modifier. A modifier can be a linear multiplier or another similar computationally simple function used to estimate the non-dominant factor instead of using the look-up table, which could be more computationally intensive.

At operation 26, the algorithm decides whether or not a factor is dominant or non-dominant. At operation 28, for each of the dominant factors within the particular sub-route, the algorithm can run a pattern matching analysis in which the pattern-matching algorithm will match the factors to find estimated energy usage for each of the candidate sub-routes.

At operation 30, the route-independent factors are retrieved. These factors are defined as factors whose variation is not a function of the route. They can be viewed as relatively static factors for all candidate routes. Thus, they can share the same look-up tables for online computation. The route-independent factors can impact the energy-usage calculation in such a way that they cannot be simplified or abstracted away from the algorithm. For example, a vehicle's weight could remain the same for all candidate routes when using a particular vehicle, but the impact of the vehicle's weight on energy efficiency for Route A and Route B can be different depending on many factors such as the inclination of the route, wind speed and drag. If a route has a steep inclination, the vehicle's weight will significantly increase the total energy usage. Hence, the route-independent factors should be included in the energy calculation.

Route-independent factors are relatively stable and can be retrieved using the vehicle sensors 14 (FIG. 1). There are two types of route-independent factors: 'time-invariant' and 'time-variant.' Time-invariant factors do not change for a specific vehicle over time. These factors include vehicle configuration, total frontal area and vehicle design. Time-variant factors can change over time. They can also be unique to each individual driver. These include driving style, temperature, vehicle weight, accessory load, tire pressure, battery efficiency and state of charge (SOC).

Figure 4:
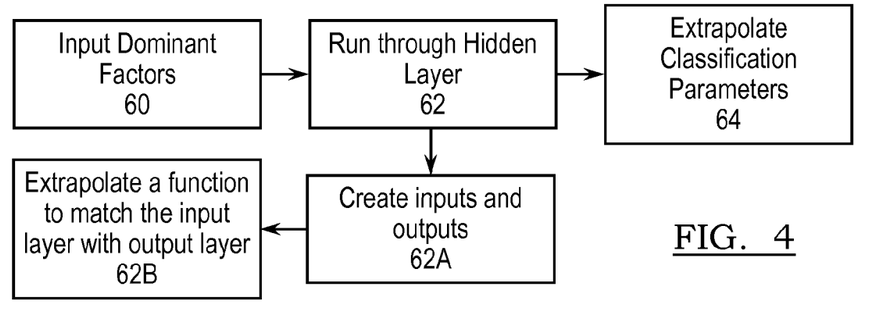
FIG. 4 is a flow chart of a route energy prediction algorithm.

To determine driving style, a pattern recognition algorithm can be used, which will be discussed further with reference to FIG. 4. The vehicle's weight is an example of a time-variant factor because although a vehicle generally has constant weight, the load distribution of the vehicle can change. This is especially true for fleet vehicles and trucks. Therefore, it can be important to calculate the vehicle's weight each time the algorithm is used. Tire pressure, battery efficiency and state of charge can also be calculated using vehicle sensors. At operation 28, the algorithm loads this data and then accesses the correct multi-dimensional look-up table based on the particular route-independent factor for a given vehicle.

At operation 32, the multi-dimensional look-up table is retrieved to allow the parameters that need to be substituted into the time-invariant factors to be held constant. This saves possible intensive computational calculations.

At operation 34 based on the multi-dimensional look up table, energy usage for candidate sub-routes are calculated for each of the possible routes. At operation 38, the modifiers are located for all the non-dominant factors for the candidate sub-route. At operation 34, the energy routes are re-calculated using the modifier. The modifier can be a constant that is multiplied with the overall route energy, or it can be a linear modifier. Since the modifiers play a relatively minor role in the overall route-energy calculation, it may not be worth the intensive computation to compute them exactly. Modifiers also allow for faster computation as they are not resource-intensive. At operation 40, the algorithm determines if all the possible sub-routes have been iterated through. If they have not, then the algorithm returns to operation 24. Else, after the modified energy route has been calculated for all possible sub-routes, at operation 42, the algorithm searches through and compares all the possible energy calculations and identifies the route that consumes the minimum energy. The search can be performed using either a Dijkstra algorithm or an A* algorithm which is well known in the art. This route is then presented to the user.

Figure 3:
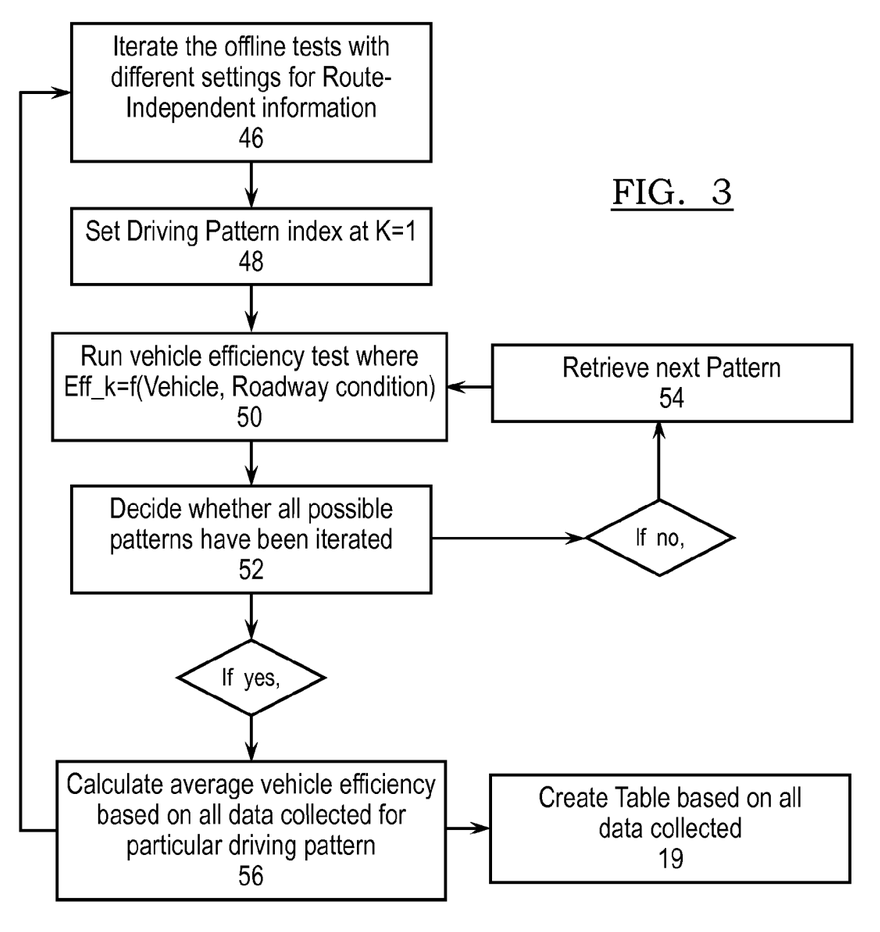
FIG. 3 is a flow chart of a method for collecting and creating mean vehicle efficiency tables using simulations or vehicle test data.

FIG. 3 illustrates the method for collecting and creating the mean vehicle efficiency tables using simulations or vehicle test data. For each set of route-independent information, a corresponding look-up table with various route-dependent factors along with an estimated energy usage is created. Once the route-independent information is determined, the appropriate table can be loaded. Since significant non-linear factors for calculating vehicle efficiency are based upon route patterns which include roadway type, traffic conditions and speed profiles, it is possible to collect data on how the vehicle behaves in terms of energy efficiency with respect to these conditions. At operation 46, the route-independent data is held constant so that different route patterns can be collected. The mean energy efficiency does not vary significantly for similar route patterns. Consequently, collecting test data for these parameters allows the algorithm to store the mean vehicle efficiency in a table to minimize real-time computation. Energy usage with different route patterns can be estimated using certain parameters: total driving distance, average velocity, maximum velocity, standard deviation of acceleration, mean acceleration, mean deceleration, maximum deceleration, percent of time spent in speed interval 15-30 km/h, percent of time spent in speed interval 30-50 km/h, percent of time spent above 110 km/h, percent of time spent decelerating greater than 2.5 m/s, percent of time spent decelerating between 2.5-1.5 m/s, etc.

At operation 48, the number of the different types of route patterns as mentioned above is set to the total number of possible iterations, and the iteration index K is initialized to 0. At operation 50, this algorithm is executed for each type of vehicle. The vehicle can iterate through different route patterns. At operations 52-54, the algorithm decides whether it has iterated through all possible route patterns. The energy efficiency numbers generated above are needed for the on-board route energy calculation. The average vehicle energy efficiency should be consistent when simulated in the same route pattern, but it varies with different route patterns so that the route energy is accurately tied to driving conditions. Operation 56 performs the total number of route pattern iterations and the results can be stored in tables to be used on-board. This is then repeated to cover all types of route-independent information. Based on this information, look-up tables are created with the particular information (as mentioned above with respect to FIG. 2 at operation 19A-19B). The look-up tables can contain average vehicle energy for each type of route-independent condition and roadway condition. This will allow the algorithm to estimate different types of roadway conditions to calculate the vehicle energy efficiency.

After collecting the data with a list of different driving pattern types, the algorithm matches these parameters to the existing values. FIG. 4 is a flow chart of the pattern recognition and matching algorithm. At operation 60, the dominant factors are identified. These values are sent to a hidden layer at operation 62. The hidden layer has two functions: one of matching known data to existing output layers, the other of classifying new input and output sets with appropriate functions. If there is a set of training data, the hidden layer takes the set of inputs along with the set of known outputs and constructs a function to map the inputs to the outputs. In operation 62A, for each set of inputs, the algorithm sends the input through the function to extrapolate an output. In operation 62B, the hidden layer takes a value for the dominant factor and extrapolates it into a pattern matching parameter listed in FIG. 3. For example, if a particular roadway has a traffic condition of "congested," it will have similar values for the various parameters mentioned in the discussion of FIG. 3. Therefore, one can take the values of the dominant factors and run them through the function generated by the pattern-matcher. If this roadway's traffic condition matches what is classified as "high," the output will be information as to what values from the look-up table to retrieve. In operation 64, these parameters are extrapolated such that for every input factor there is an approximation parameter to be used to calculate route energy.

Figure 5:
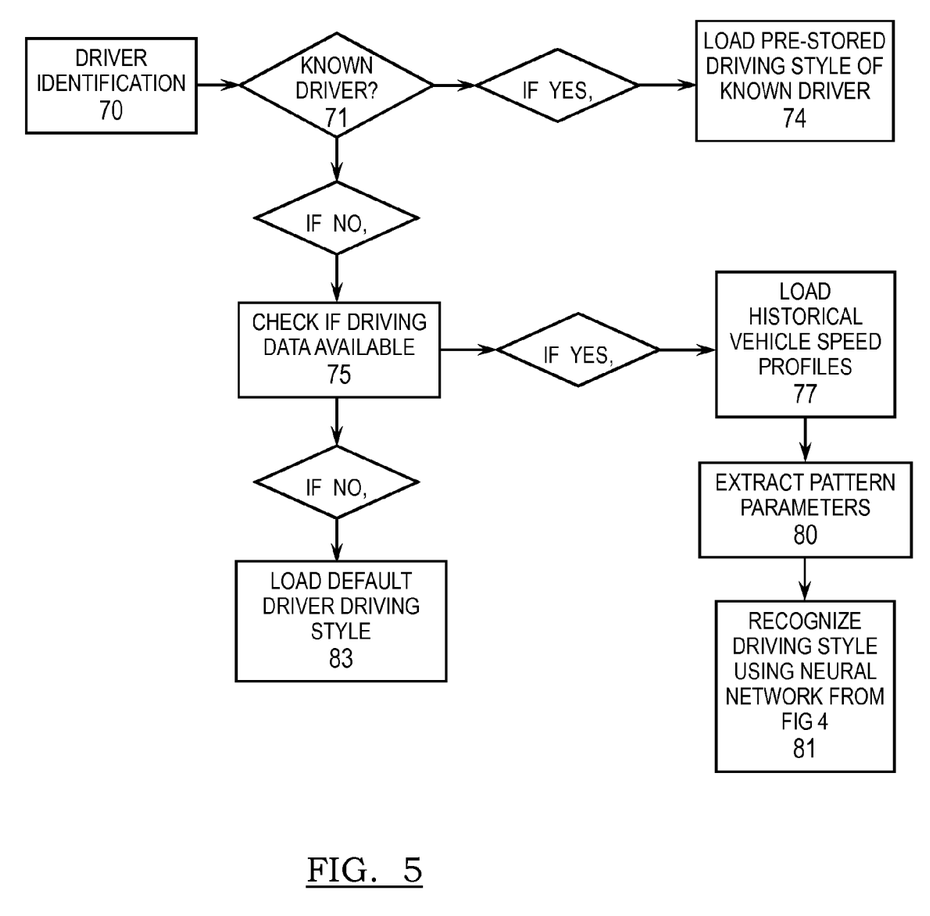
FIG. 5 is a flow chart of a driver style identification algorithm.

FIG. 5 is a flow chart of an algorithm for identifying driving-style of the individual user through the use of pattern matching techniques. At operation 70, the vehicle identifies the driver. If the vehicle has already matched a particular driving style with a drive, the vehicle will input the previously determined driving style into the variables. One method of identifying a driver includes recognizing a unique signature in a key that is used to operate the vehicle. Alternatively, the vehicle could interface with the driver's mobile phone to identify the driver. At operation 71, the vehicle determines if the driver is a known driver or not. This can be done through identifying the unique key that is located on the key fob. If the driver is known, at operation 74, and if the vehicle has already identified the driving-style of this particular driver, then the vehicle loads the profile containing this particular driver's driving style into the system (loading parameters indicative of the driver's dynamic control of the vehicle). If, however, the driver is not a previously identified driver, at operation 77, a default driving style is loaded to perform a preliminary identification of a route while the driver's driving style is being matched. If there is no data available, then the default driving style is also loaded while the driving style of that particular driver is calculated. At operation 80, the driving style is calculated based on various parameters such as rate of acceleration (jerk). The driving style is then determined using pattern matching. This can be based on the idea that the expected driving style or dynamic control of the vehicle will have different energy usage even within the same route. Classifying the driving style allows for prediction of expected vehicle control by the driver. Hence, expected energy consumption can be more effectively predicted. At operation 81, the driving data is recognized through pattern matching techniques similar to those described with reference to FIG. 4 or other known machine learning techniques.

Figure 6:
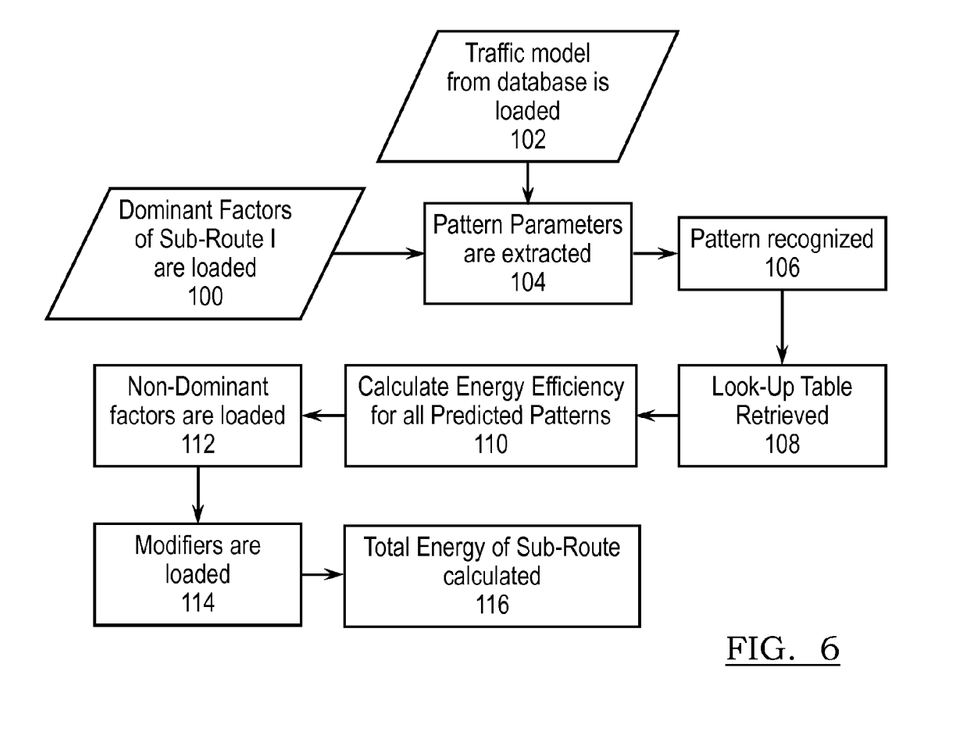
FIG. 6 is a flow chart of a route-energy calculation algorithm.

FIG. 6. is a flow chart of the route-energy calculation. At step 100, the dominant factors are loaded. This includes both route-dependent and route independent information. At operation 102, the predicted traffic model is loaded. At operation 104, route independent and route dependent information is sent to the pattern extraction section as described with reference to FIG. 3. The patterns are extracted into important parameters. At operation 106, the extracted patterns are sent to the pattern recognition sub-route that was referenced in FIG. 4. The pattern recognition algorithm then recognizes the route patterns and driving style as described with reference to FIG. 4. At operation 108, based on the values input into the pattern recognition algorithm, the appropriate look-up tables are loaded. The values in these look-up tables are used to calculate the candidate route energy at operation 110. At operation 112, the non-dominant factors are loaded. At operation 114, modifiers are loaded and used to compute the total estimated route energy. At operation 116, the total route energy is computed for a candidate route.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms can also be implemented in a software executable object. Alternatively, the algorithms can be embodied in whole or in part using suitable hardware components, such as Application Specific Integrated Circuits (ASICs), Field-Programmable Gate Arrays (FPGAs), state machines, or other hardware components or devices, or a combination of hardware, software and firmware components.

While exemplary embodiments are described above, it is not intended that these embodiments describe all possible forms encompassed by the claims. The words used in the specification are words of description rather than limitation, and it is understood that various changes can be made without departing from the spirit and scope of the disclosure and claims. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to, cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and could be desirable for particular applications.

What is claimed is:

1. A method for determining a route for a vehicle comprising:
   by at least one controller,
   receiving steering wheel, brake pedal or accelerator pedal input indicative of a driver's dynamic control of the vehicle,
   determining the driver's driving style based on a similarity between the input and sets of predetermined values each representing a different driving style,
   selecting values of parameters representing the driver's anticipated dynamic control of the vehicle based on the driving style,
   identifying a plurality of candidate routes between an origin and destination,
   partitioning each of the candidate routes into a set of predefined route patterns,
   determining an energy usage associated with each of the candidate routes based on the selected values and the set of predefined route patterns defining the candidate route,
   identifying the candidate route having the minimum energy usage, and
   providing output describing the route having the minimum energy usage.

2. The method of claim 1 wherein providing output describing the route having the minimum energy usage includes displaying the route on a map rendered on a display screen.

3. A navigation system for a vehicle comprising:
   at least one controller configured to (i) receive steering wheel, brake pedal or accelerator pedal input indicative of a driver's dynamic control of the vehicle, (ii) determine the driver's driving style based on a similarity between the input and sets of predetermined values each representing a different driving style, (iii) select values of parameters representing the driver's anticipated dynamic control of the vehicle based on the driving style, and (iv) identify a route between an origin and destination that minimizes energy consumption of the vehicle based on the selected values.

4. The system of claim 3 wherein identifying a route between an origin and destination that minimizes energy consumption of the vehicle based on the selected values includes partitioning each of a plurality of candidate routes into a set of predefined route patterns.

5. The system of claim 4 wherein identifying a route between an origin and destination that minimizes energy consumption of the vehicle based on the selected values includes determining an energy usage associated with each of the candidate routes based on the selected values and the set of predefined route patterns defining the candidate route.

6. The system of claim 5 wherein identifying a route between an origin and destination that minimizes energy consumption of the vehicle based on the selected values includes selecting the candidate route having the minimum energy usage.

7. The system of claim 3 wherein selecting values of parameters representing the driver's anticipated dynamic control of the vehicle based on the driving style includes matching previous values of parameters representing the driver's anticipated dynamic control of the vehicle with a set of energy usage patterns associated with current values of parameters representing the driver's expected dynamic control of the vehicle.

8. The system of claim 3 wherein the at least one controller is further configured to provide output describing the route.

9. A method for determining a route for a vehicle comprising:
   by at least one controller,
   detecting driver steering wheel, brake pedal or accelerator pedal inputs indicative of a driver's dynamic control of the vehicle,
   determining the driver's driving style based on a similarity between the inputs and sets of predetermined values each representing a different driving style,
   selecting values of parameters representing the driver's anticipated dynamic control of the vehicle based on the driving style,
   identifying a route between an origin and destination that minimizes energy consumption of the vehicle based on the selected values, and
   providing output describing the route.

10. The method of claim 9 wherein identifying a route between an origin and destination that minimizes energy consumption of the vehicle based on the selected values includes partitioning each of a plurality of candidate routes into a set of predefined route patterns.

11. The method of claim 10 wherein identifying a route between an origin and destination that minimizes energy consumption of the vehicle based on the selected values includes determining an energy usage associated with each of the candidate routes based on the selected values and the set of predefined route patterns defining the candidate route.

12. The method of claim 11 wherein identifying a route between an origin and destination that minimizes energy consumption of the vehicle based on the selected values includes selecting the candidate route having the minimum energy usage.

13. The method of claim 9 wherein selecting values of parameters representing the driver's anticipated dynamic control of the vehicle based on the driving style includes matching previous values of parameters representing the driver's anticipated dynamic control of the vehicle with a set of energy usage patterns associated with current values of parameters representing the driver's expected dynamic control of the vehicle.

14. The method of claim 9 wherein providing output describing the route includes displaying the route on a map rendered on a display screen.

* * * * *